United States Patent
Moerkotte et al.

(10) Patent No.: US 10,482,085 B2
(45) Date of Patent: Nov. 19, 2019

(54) METHODS AND SYSTEMS FOR ESTIMATING THE NUMBER OF POINTS IN TWO-DIMENSIONAL DATA

(71) Applicant: SAP SE, Walldorf (DE)

(72) Inventors: Guido Moerkotte, Mannheim (DE);
Norman May, Karlsruhe (DE);
Alexander Boehm, Sandhausen (DE)

(73) Assignee: SAP SE, Walldorf (DE)

( * ) Notice: Subject to any disclaimer, the term of this patent is extended or adjusted under 35 U.S.C. 154(b) by 674 days.

(21) Appl. No.: 14/975,086

(22) Filed: Dec. 18, 2015

(65) Prior Publication Data
US 2017/0177663 A1    Jun. 22, 2017

(51) Int. Cl.
*G06F 7/00*        (2006.01)
*G06F 16/2453*     (2019.01)
*G06F 16/174*      (2019.01)
*G06F 16/22*       (2019.01)
*G06F 16/28*       (2019.01)

(52) U.S. Cl.
CPC .... *G06F 16/24534* (2019.01); *G06F 16/1744* (2019.01); *G06F 16/2246* (2019.01); *G06F 16/283* (2019.01)

(58) Field of Classification Search
CPC .................................................... G06F 16/283
USPC ......................................................... 707/786
See application file for complete search history.

(56) References Cited

U.S. PATENT DOCUMENTS

| | | | | |
|---|---|---|---|---|
| 6,091,422 A | * | 7/2000 | Ouaknine | G06T 19/00 345/419 |
| 6,470,344 B1 | * | 10/2002 | Kothuri | G06F 16/2264 707/696 |
| 6,625,611 B1 | | 9/2003 | Teig et al. | |
| 6,701,306 B1 | * | 3/2004 | Kronmiller | B60T 8/172 707/797 |
| 2005/0226518 A1 | * | 10/2005 | Suzuki | H04N 19/172 382/246 |
| 2015/0205884 A1 | * | 7/2015 | Leventhal | G06F 16/80 715/234 |
| 2017/0017612 A1 | * | 1/2017 | Simonyi | G06F 17/2247 |

OTHER PUBLICATIONS

"Communication: Extended European Search Report", European Patent Office, Jun. 12, 2017 (Jun. 12, 2017), for European Application No. 16002532.6-1507, 8pgs.

(Continued)

*Primary Examiner* — Eliyah S. Harper
(74) *Attorney, Agent, or Firm* — Buckley, Maschoff & Talwalkar LLC

(57) ABSTRACT

A method, medium, and system to generate cardinality estimates for at least one query execution plan for a query by representing a given set of multidimensional data including a plurality of data points having a value by a hierarchical tree data structure including nodes, each node representing a distribution of a subset of the points in the data set and being partitioned into tiles; calculating a bounding rectangle of the data points in each node; entering all non-empty tiles into a queue; processing of the queue can continue until a computational memory space limit is reached or until a desired estimation resolution is met; and encoding the resulting tree structure.

20 Claims, 7 Drawing Sheets

(56) References Cited

OTHER PUBLICATIONS

Moerkotte, Guido et al., "Exploiting Ordered Dictionaries to Efficiently Construct Histograms with Q-Error Guarantees in SAP HANA", Proceedings of the 2014 ACM SIGMOD International Conference on Management of Data, SIGMOD '14, Jun. 18, 2014 (Jun. 18, 2014), EP055152095, DOI: 10.1145/2588555.2595629, ISBN: 978-1-45-032376-5, (pp. 361-372, 12 total pages).

\* cited by examiner

| $\theta$ | theoretical max q-error | experimental max q-error | avg q-error |
|---|---|---|---|
| 1% | 100 | 97.5 | 13.4 |
| 2% | 50 | 48.8 | 7.5 |
| 3% | 33 | 32.2 | 5.5 |
| 5% | 20 | 19.5 | 3.8 |
| 10% | 10 | 9.7 | 2.5 |

600

| itv | comp | dec | q-error |
|---|---|---|---|
| [0,1[ | 0 | 0 | 1 |
| [1,5[ | 1 | 2 | 2 |
| [5,21[ | 2 | 10 | 2 |
| [21,85[ | 3 | 42 | 2 |

METHODS AND SYSTEMS FOR ESTIMATING THE NUMBER OF POINTS IN TWO-DIMENSIONAL DATA

FIELD

Some embodiments relate to executing and optimizing queries executed by database management systems. In particular, some embodiments concern methods and systems for optimizing queries by providing accurate cardinality estimations for data sets of two- or multi-dimensional data sets in an efficient and accurate manner. In some aspects, the data structures used to derive the estimates are also optimized in a number of ways.

BACKGROUND

Query optimization may depend, in large part, on efficient and accurate cardinality estimates of intermediate results and the plan for the order of a sequence or set of operators representative of a query. Various methods have been previously proposed for determining cardinality estimates. However, a number of the previous proposals provide results that are not very accurate, despite being complex (e.g., inefficient) and/or resource-costly to calculate.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
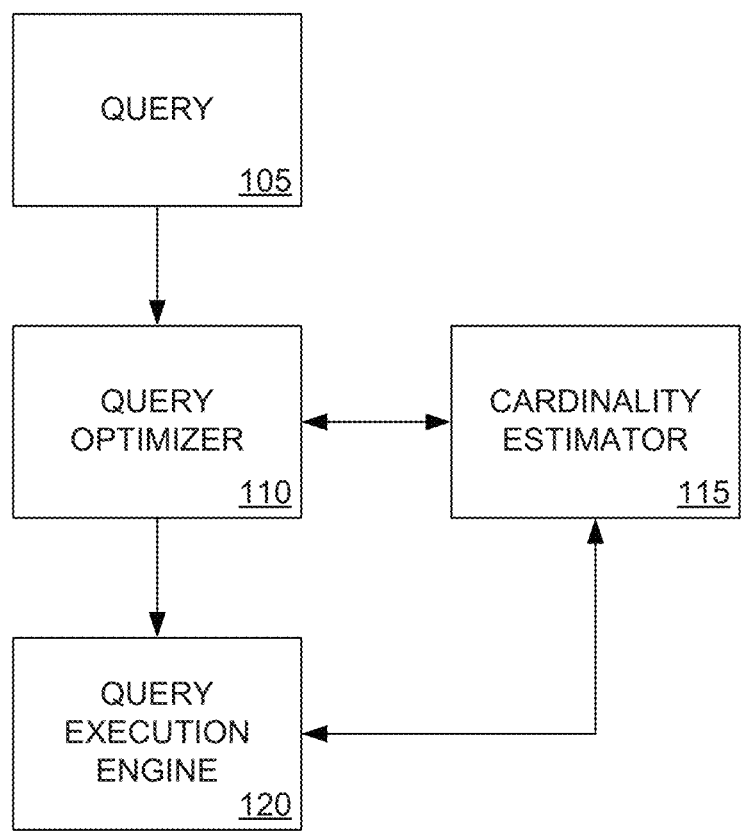
FIG. 1 is an illustrative schematic block diagram of a system, in some embodiments herein.

FIG. 1 is a functional flow diagram for a process or service of a database management system (DBMS). A query 105 may be sent to, obtained by, or otherwise received by a cost based query optimizer 110. Query optimizer (QO) 110 may be implemented by a query server or other server or system providing the services and functionality of query optimizer 110. Query optimizer 110 may operate to produce a query execution plan (QEP) for executing the requested query 105 in a "cost effective" manner. In some aspects, query optimizer 110 and (potentially) query execution engine 120 interact with a cardinality estimator 115. In some aspects, query optimizer 110 may mainly retrieve data from cardinality estimator 115, while query execution engine 120 may have a bi-directional data exchange relationship with cardinality estimator 115. Cardinality estimator 115 may be used by the query optimizer 110 to determine or calculate cardinality estimates. Cardinality estimator 115 may interact with query execution engine (QEE) 120 because the query execution engine (or data source) provides the raw data to generate statistics. In some cases, the cardinality estimates may also be used for approximate query processing. The query plan (QP) generated by query optimizer 110 may be forwarded to and executed by a query execution engine 120 of the DBMS in a runtime environment (not shown) to generate a query result in response to the execution of the query. In some embodiments, a query server may comprise cardinality estimator 115 or the functionality thereof, while in some other or alternative embodiments cardinality estimator 115 may be a component, system, subsystem, or service that is distinct from the query server.

Figures 2, 3:
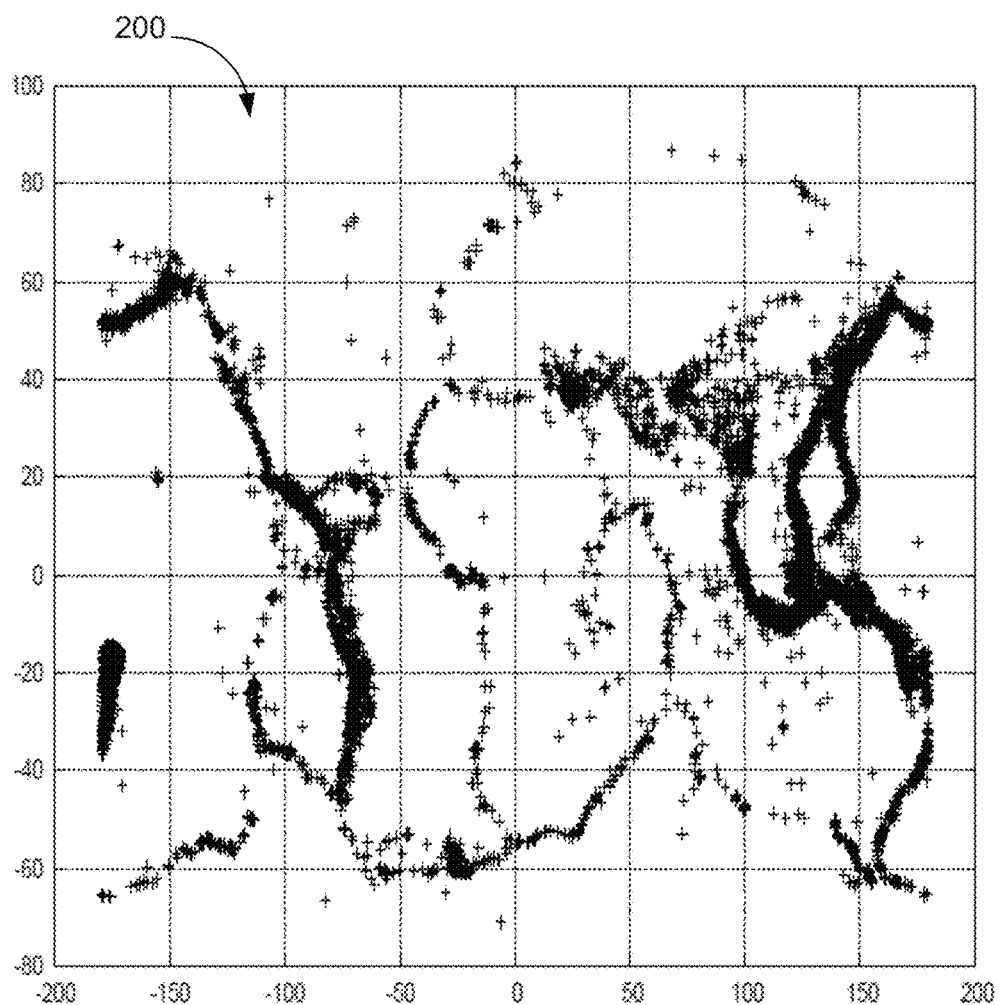
FIG. 2 is an illustrative depiction of multidimensional data, in accordance with some embodiments herein.
FIG. 3 includes tabular listings of some partitioned data, according to some embodiments.

FIG. 2 is an illustrative depiction of an exemplary representation of a multi-dimensional data set. In the present example, the data includes two dimensions but additional dimensions totaling more than two are considered and encompassed herein. The data set represented in FIG. 2 includes a two-/multi-dimensional histogram described in publications and referred to as the centennial earthquake catalogue (CEC). FIG. 2 contains a two-dimensional plot 200 of all of the data points (i.e., values) in the CEC data set. The depicted data set contains 13030 tuples with 12882 different longitude/latitude pairs. These two values are represented by 32 bit floating point numbers.

In some aspects, data represented in the histogram 200 of FIG. 2 may be compressed in order to efficiently use memory storage resources. In some instances, a compression ratio of about 1:100 is viewed as favorable. In this example, the histogram may consume about 1 percent of the space the original data points consume. In the present example including the CEC data, memory consumption may include 13030·(4+4)·0.01[B]=1042.4 [B]. Accordingly, the histogram will be about 1 KB in size. However, the actual data size may vary.

FIG. 3 includes a tabular listings of a top-level 4×4 and 5×5 regular partitioning of the CEC data set at 305 and 310, respectively, where the data distribution includes a two-dimensional data set.

In some embodiments herein, a q-error is used as an error metric for the cardinality estimation provided by the histograms. As used herein, the q-error is the factor by which the estimate deviates from the true value. In some embodiments herein, the factor between the costs of a query plan generated due to cardinality estimation errors and an optimal plan may be bound by a q-error less than a power of two (2).

Numerous techniques and processes have been proposed to estimate a distribution of data in a two-multi-dimensional data set. A most simple estimator is one that always returns a constant, ê. Herein, we can assume that a θ used for testing θ, q-acceptability is given.

Furthermore, using ê=θ restricts the q-error in a cardinality estimation to, at most, |P|/θ. This value will be referred to as the theoretical maximum q-error. Accordingly, the estimate produced by the constant estimator will be θ, (n/θ)-acceptable if there are n points in a set of points P.

Note that a larger ê with ê>θ can lead to higher errors as they become larger than ê>|P/θ|, since an actual query may return zero elements and ê>θ implies that the q-error is using ê/1.

Figures 4, 5:
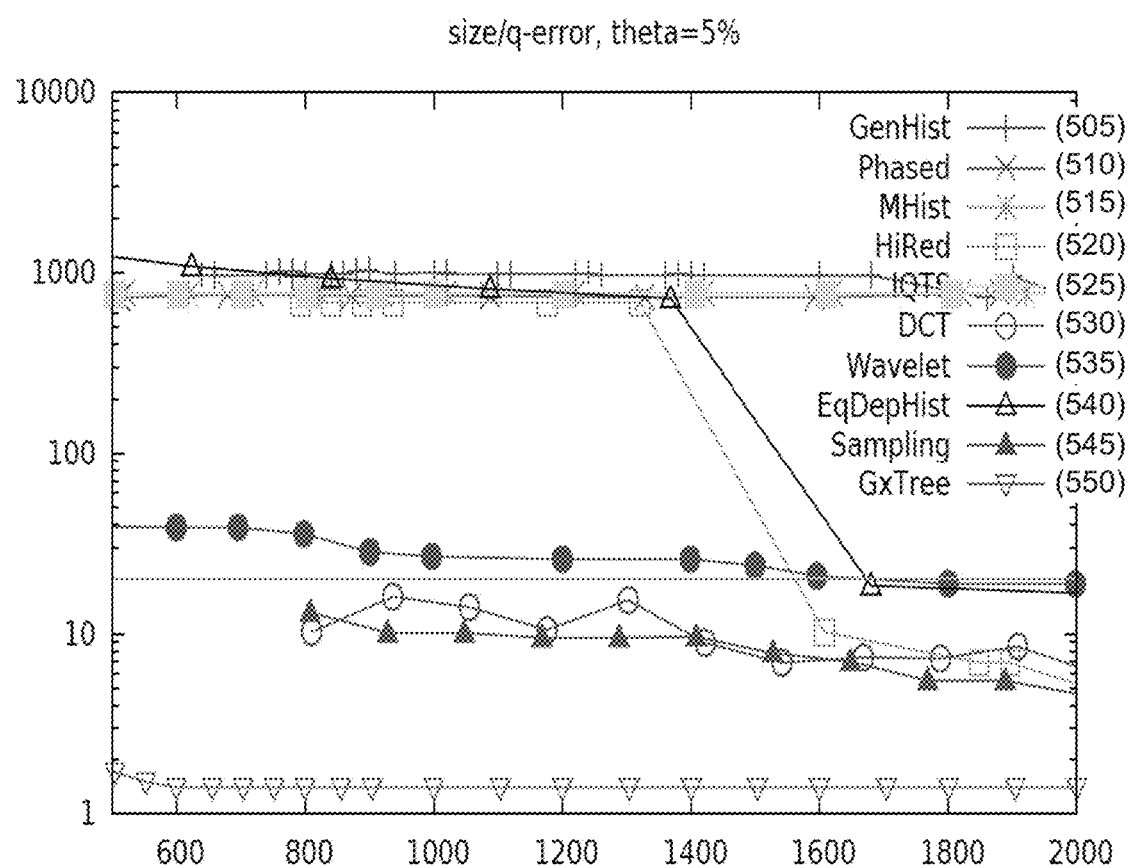
FIG. 4 is an illustrative tabular listing relating to some embodiments herein.
FIG. 5 is an illustrative depiction of a number of graphed plots of different estimators, including some embodiments herein.

The performance of the constant estimator (ê) for the earthquake dataset CEC is shown in FIG. 4 where experimentally observed maximum and average q-errors for different θs are listed in tabular form. In the example of FIG. 4, the experimentally observed values were generated by calculating the q-error of the estimate for 7 million different queries. Of note, the first million queries where random queries whereas the other 6 million queries were generated by systematically moving query rectangles of increasing size over a bounding rectangle of the data points. The table of FIG. 4 shows the experimentally observed maximal q-error is quite close to the theoretical maximal q-error. As such, this can be viewed as evidence that the testing procedure used was appropriate. Additionally, FIG. 4 shows that the average q-errors are rather low.

There are other methods and procedures for estimating cardinality, other than the constant estimator discussed above. One known technique for addressing the estimation problem proposed using "regular partitioning", where a bounding rectangle of the data points is divided in an equal widths on both dimensions. However, such an approach consumes a rather large amount of memory. Successive splitting of the dimensions in an equi-depth fashion was proposed by others, Muralikrishna and DeWitt. Some of these specific and other previous proposals for determining cardinality estimates are depicted in FIG. 5. FIG. 5 includes line graphs for estimations determined using a variety of process, including those labeled GenHist (505), Phased (510), MHist (515), HiRed (520), IQTS (525), DCT (530), Wavelet (535), EqDepHist (540), and Sampling (545).

The results of an evaluation of the estimation error for a number of known estimators is shown in FIG. 5 for different estimators executing on the centennial earthquake catalogue data introduced in FIG. 2. The graph of FIG. 5 also includes a horizontal line 545 that represents an execution of the simple or constant estimator discussed above. The X-axis of graph 500 in FIG. 5 represents an amount of memory consumed per the estimation techniques and the Y-axis represents, in a logarithmic scale, the error. As shown, the simple, constant estimator represented at line 545 has a lower error than many of the more "sophisticated" estimators.

In accordance with some embodiments herein, a maximum allowable q-error for a query optimizer herein may have a value of about 2. Referring to FIG. 5 again, it is noted that the results for the different estimators therein (e.g., 505-545) produce errors that are much greater than the value 2 given the logarithmic scale of the Y-axis.

In accordance with some embodiments herein, FIG. 5 further includes a line graph 550 illustrating the error associated with an estimator of the present disclosure. As seen, line 550 is the only approach or estimation procedure in FIG. 5 that processes acceptable estimates (i.e., about 2).

In some embodiments herein, a data structure representative of a hierarchical tree provides a mechanism for generating accurate cardinality estimates in an efficient manner. This tree data structure may be referred to herein as a "GxTree", but it is the functionality and other characteristics of the data structure that are significant, as opposed a naming or labeling thereof. As an overview, each node (whether an inner node with at least one child node or a leaf node without any child nodes) may represent a distribution of (a subset of) the points in a given data set via a regular partitioning and can be encoded as a grid. More specifically, a grid may be a compressed version of a frequency matrix M of some regular partitioning. In some embodiments, one or more tiles of a grid may be refined (i.e., split or further sub-divided). As such, a grid that is refined will reference at least one child node.

In some embodiments, a GxTree tree structure herein may support more than one type of node, where the "type" of a node refers to its size. Accordingly, an embodiment herein that supports four types or kinds of nodes supports nodes of four different sizes. As an example, consider a GxTree that supports four different node sizes—G-nodes (224 bits), L-nodes (128 bits), M-nodes (64 bits), and S-nodes (32 bits). In this example, inner G-nodes might partition their data points using a regular 5×5 partitioning, L-nodes could use 4×4 regular partitioning, M-nodes might use 3×3 regular partitioning, and S-nodes in this example may be represented by 2×2 regular partitioning. For leaf nodes, the partitioning may vary and be due, at least in part, to a leaf refinement process (as will be discussed below).

In accordance with some embodiments, various aspects herein may contribute to flexibly representing data coarsely where there may be no or relatively few values in a portion (i.e., sub-set) of a data set for which an estimate is being processed. In an area of a data distribution where there may be few, if any, values, a corresponding tile may be large(r) and not refined or divided, in accordance with some aspects herein. A larger tile without sub-divisions may use less memory than, for example, a partition (i.e., grid) including numerous values therein and multiple smaller to tiles to provide a refined, granular insight into the data therein. In this manner, more memory may be allocated and used to get more precise estimates where the data distribution has values. In accordance with some aspects herein, a resolution onto the data may be more granular for areas of the data distribution where there is more data, and more coarse in areas of less/no data values in a subject data distribution.

In some embodiments herein, a priority queue (or simply "queue") may be used to keep track of the most dense clusters or areas of a data distribution. The priority queue may be maintained to the extent memory is available. In some embodiments, the priority queue (or other mechanism with similar functionality) includes tiles that may be selectively divided into smaller tiles to get more precise insights into the details of the data. In some aspects, the queue contains a sequence or list of nn-refined tiles, where a tile next in the queue is then refined (i.e., subdivided into many tiles via some regular partitioning.

In some aspects, a GxTree herein may have to store a large quantity of numbers therein. In some regards, it may be technically desirable to make efficient use of the memory space. One method of doing this is by compressing the data stored in tiles herein. That is, a process to compress data in order to use as few bits as possible while preserving an accurate representation of the data is desired. In the context of the present disclosure, a compression herein should minimize the q-error associated with a cardinality estimation.

In some regards, two approaches have been used for some aspects of cardinality estimate compression, including q-compression and binary q-compression. In the q-compression procedure, for a fixed base b, any number x in the interval $[b^{2k}, b^{2(k+1)})$ is approximated by $b^{2k+1}$, which results in a maximal q-error of b. Compression may then be performed by $[\log_b(x)]+1$ and decompression by $b^{y-1+0.5}$. However, q-compression has two glaring disadvantages. First, it wastes bits if the base is less than $\sqrt{2}$ and secondly it is rather expensive to calculate, particularly a decompression due to the calculation of a exp function of the decompression is the most frequent operation during an estimation process.

Regarding binary q-compression, the base b is taken to be two (i.e., binary) and thus fixed. However, one of the biggest disadvantages of binary q-compression is its lack of flexibility. Contrary to q-compression where the q-error can be governed by the value of the base b, binary q-compression has a q-error of $\sqrt{2}$.

In some embodiments herein, a q-compression scale (i.e., "scale") is disclosed. The q-compression scale disclosed herein is flexible and efficient, especially for number of the bits that it uses.

As used herein, a q-compression scale includes an ordered sequence of n non-negative integers $s_0, s_1, \ldots, s_n$ and two mappings. The first mapping is for the compression and the second mapping is for the decompression process. For compression, any number in the half-open interval $[s_i, s_{i+1}[$ is mapped to i. During decompression, i is mapped to $s_i^* \sqrt{s_i \times (s_{i+1}-1)}$. Accordingly, the q-error for numbers in $[s_i, s_{i+1}[$ is $\sqrt{s_i \times (s_{i+1}-1)/s_i}$.

In some embodiments herein regarding the GxTree, the values of $0, 1, s_2, \ldots, s_n$ are used such that zero is compressed without loss of precision since there are typically plenty of zeros. In some aspects, the scales may be used where smaller numbers are compressed with less precision than larger numbers. In some embodiments, for every (i.e., any) number of bits, there are also several scales, different $s_n$ and different precision. This flexibility allows one to choose the most precise scale able to compress the largest number currently to be compressed. Of note in some embodiments, the q-compression scale has $n=2^b$ for some number of bits b.

Figures 6, 7:
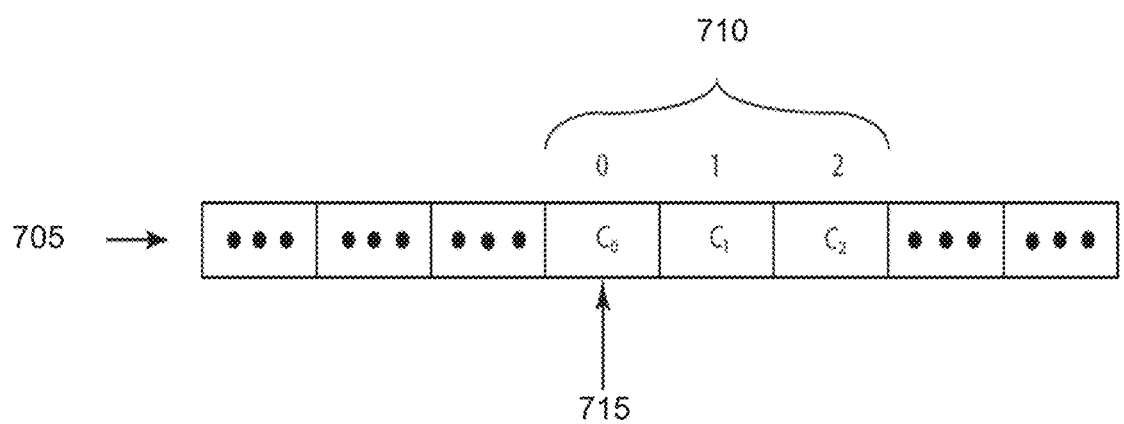
FIG. 6 is an illustrative tabular listing of compression scales, in accordance with some embodiments herein.
FIG. 7 is an illustrative depiction of an array related to nodes, in some embodiments herein.

In accordance with some aspects herein, an exemplary tabular representation 600 of a scale is shown in FIG. 6. Based on the table of FIG. 6, two bits can be used to compress numbers in the interval of [0, 84] with a maximum q-error of 2. It is noted that a decompression process, which is the predominant operation during cardinality estimation using the GxTree, can be implemented by referencing a lookup table (e.g., FIG. 6). The lookup table of FIG. 6 provides a mapping guide of how to, for each of the specified intervals 605 therein, encode the data. The table is retained and referred to during both the encoding process of compression 610 and decompression 615. The corresponding q-error for the intervals listed at 605 are shown in column 620.

In some embodiments, we let D be a set of all data points, R is a rectangle containing all of the points in D, M is a frequency matrix of a regular partitioning $RegP_{oxo}(R, P)$, and C is a scale with b bits. As such, a leaf node grid $G_{o,b}^-$ is an array of $o*o*b$ bits where each entry G(i, j) contains the bits representing the compression of M(i, j) using C. An inner node grid $G_{o,b}^+$ consists of $o*o*(b+1)$ bits, where the additional bit indicates whether the tile has been split. That is, whether there is a subtree in the GxTree representing the distribution of the data points in the tile.

In some embodiments, the b bits in an entry of a $G_{o,b}^+$ grid with the indicator bit set to 1 are used to represent child pointers. The indicator bit can be denoted as iBit and the other bits as fBits. If the iBit is zero, then the fBits contain the compressed tile frequency using some scale C. If the iBit is set to 1, then the fBits contain a child referencing mechanism, as described below.

In general, the encoding of tree structured multi-dimensional histograms involved either full pointers that point to child nodes requiring 64 bit (or the like) representations or no pointers at all (i.e., IQTS). The full pointers implementation is too space consuming, while the no pointers alternative is too expensive time-wise during query estimation since the full tree has to be reconstructed for every estimate involving the right-most leaf. The present disclosure presents an approach that provides technical improvements regarding both space consumption and estimation time. In some embodiments herein, nodes of a GxTree that are of a same node type (e.g., size) are stored in one distinct array. Nodes of a particular type can then be addressed by an index into appropriate, corresponding array for each type of node.

In some aspects, each node has its children stored consecutively. In such configurations, one index can be used to address the first child and a small sub-index can be used to index the children within the sub-array of child nodes. For the sub-index used to index the children, an indicator bit (iBit) of a node can be used to indicate the existence of child pointers and the fBits of the node can be used to encode the sub-index into the child node sub-array. In some embodiments where there is only one type of node, this configuration and mechanism suffices.

An array illustrating the child referencing aspects of some embodiments herein is depicted in FIG. 7. For each type of node there may be one byte array 705 containing all nodes of a particular type. A child node is indexed by a child base index 715 containing the index of the first child node $C_0$ within a child index sub-array 710 of the array 705. Child base index 715 can be stored within a node if it contains child nodes of the respective type. In some instances, $2^{64}$ different partitions or rectangles can be encoded with 64 bits, far greater than other encoding techniques and in some use-cases much more than needed. As shown in FIG. 7, offsets relative to the first child node, $C_0$, are encoded as opposed to 64 bit pointer encodings.

Figure 8:
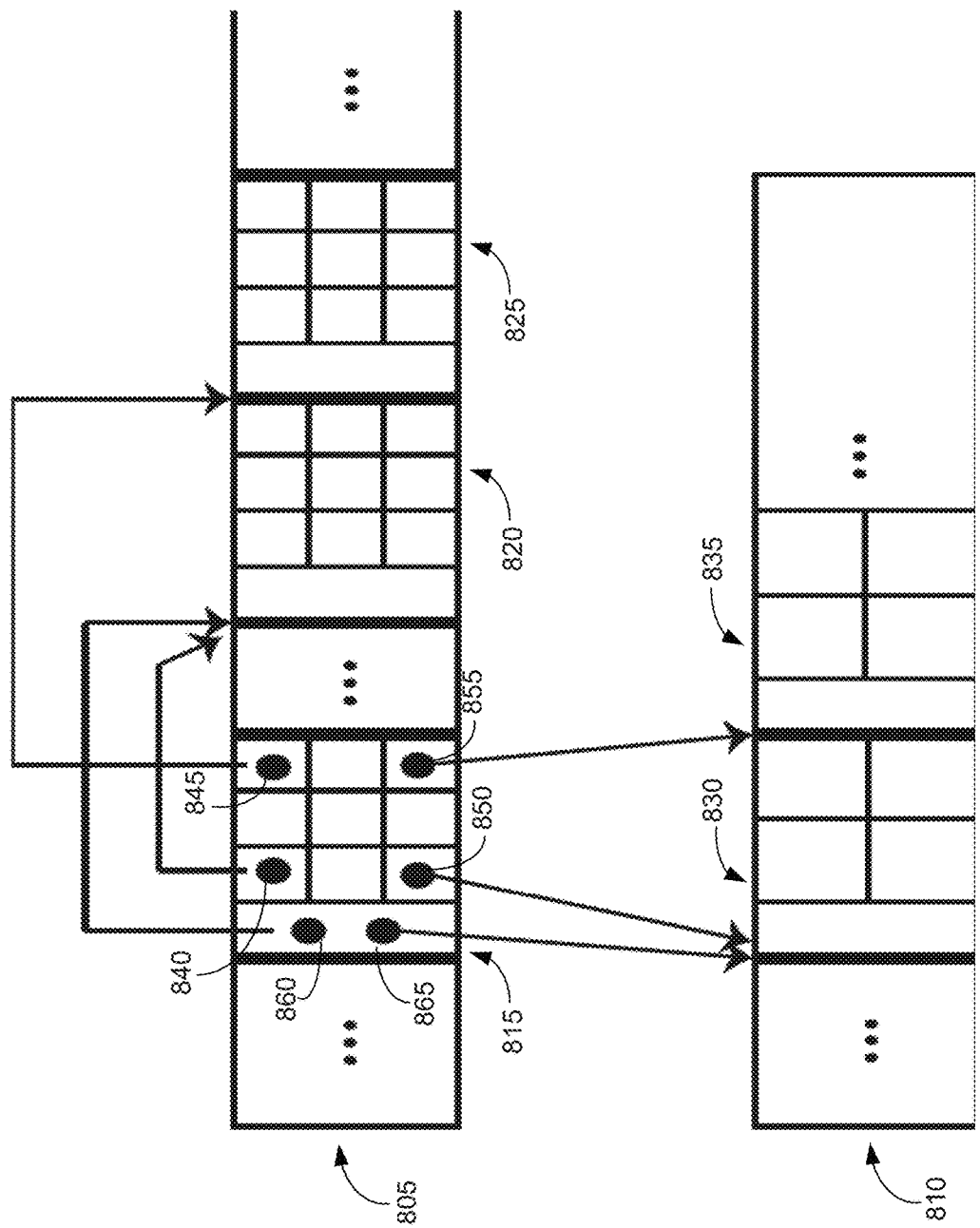
FIG. 8 is an illustrative depiction of node arrays, in accordance with some embodiments herein.

FIG. 8 is an illustrative depiction of arrays, in accordance with some embodiments herein. In particular, FIG. 8 includes two arrays 805 and 810. Array 805 includes nodes of a first size and array 810 includes nodes of a second size. Array 805 includes three nodes 850, 855, and 860 that are partitioned into a 3×3 grid. Array 810 includes two nodes 830 and 835 that are each partitioned into a 2×2 grid. Array 805 may be referred to as including ×3 "G-nodes", whereas array 810 includes 2×2 "L-nodes".

In the example of FIG. 8, G-node 815 has four children as indicated at 840, 845, 850, and 855. More specifically, node 815 has two G-node children (840 and 845) and two L-node children (850 and 855). G-node 815 includes two child base pointers 860 and 865 pointing to the beginning of an associated sub-array containing the corresponding child nodes. In some embodiments herein, within a grid offsets point to a child via the addressing mechanism previously introduced. Accordingly, the sub-arrays may include a child-base pointer and the appropriate offset. In some embodiments where there is more than one type of node (e.g., the earlier example herein of four types of nodes where the "type" of node is based on a size), a further child referencing mechanism can be used. In some embodiments, we let k denote the maximal number of children that can be indexed given a number of fBits. The range of numbers 0 . . . k can be partitioned into two, three, or four sub-ranges, where each sub-range corresponds to one type of array and each sub-range is as wide as the number of child nodes of the corresponding node type requires. In an instance where a node addresses children of more than one kind (e.g., m different types), the number of child nodes for the first m−1 is additionally stored. The child index of kind k may be calculated by subtracting the sum of children of kind 1 to k−1 from the fBits' content.

In some embodiments, an integer partitioning ranking/unranking procedure can be used where a node addresses children of more than one kind. Still, other procedures for encoding pointers may be implemented in some embodiments herein.

In some contexts, substantial precision may be added if a bounding rectangle is stored in cases where it is strictly contained in the node's full tile rectangle, as calculated by a parent node. However, such gains can be lost when taking the memory consumption of the bounding rectangle into account. This is due to the fact that storing a bounding rectangle may require the storing of four (4) floating point values which is an expensive cost. In some embodiments, a bounding rectangle for a root node is always stored.

In some embodiments, an original rectangle may be passed down from the parent node into, for example, a 16×16 regular partitioning. The number of border columns and rows that contain only zeros can then be determined. If none exist, then no bounding rectangle need be stored. However, if some exist then four corners can be stored in 4 bits each and the reduced bounding rectangle can be reconstructed using the counters. In this manner, a discretized bounding rectangle can be represented by 16 bits. In some embodiments, one additional bit may be used to indicate whether there is a bounding rectangle or not. This additional bit can allow for the reclaiming of bits that might otherwise be used for the discretized bounding rectangle representation.

Figure 9:
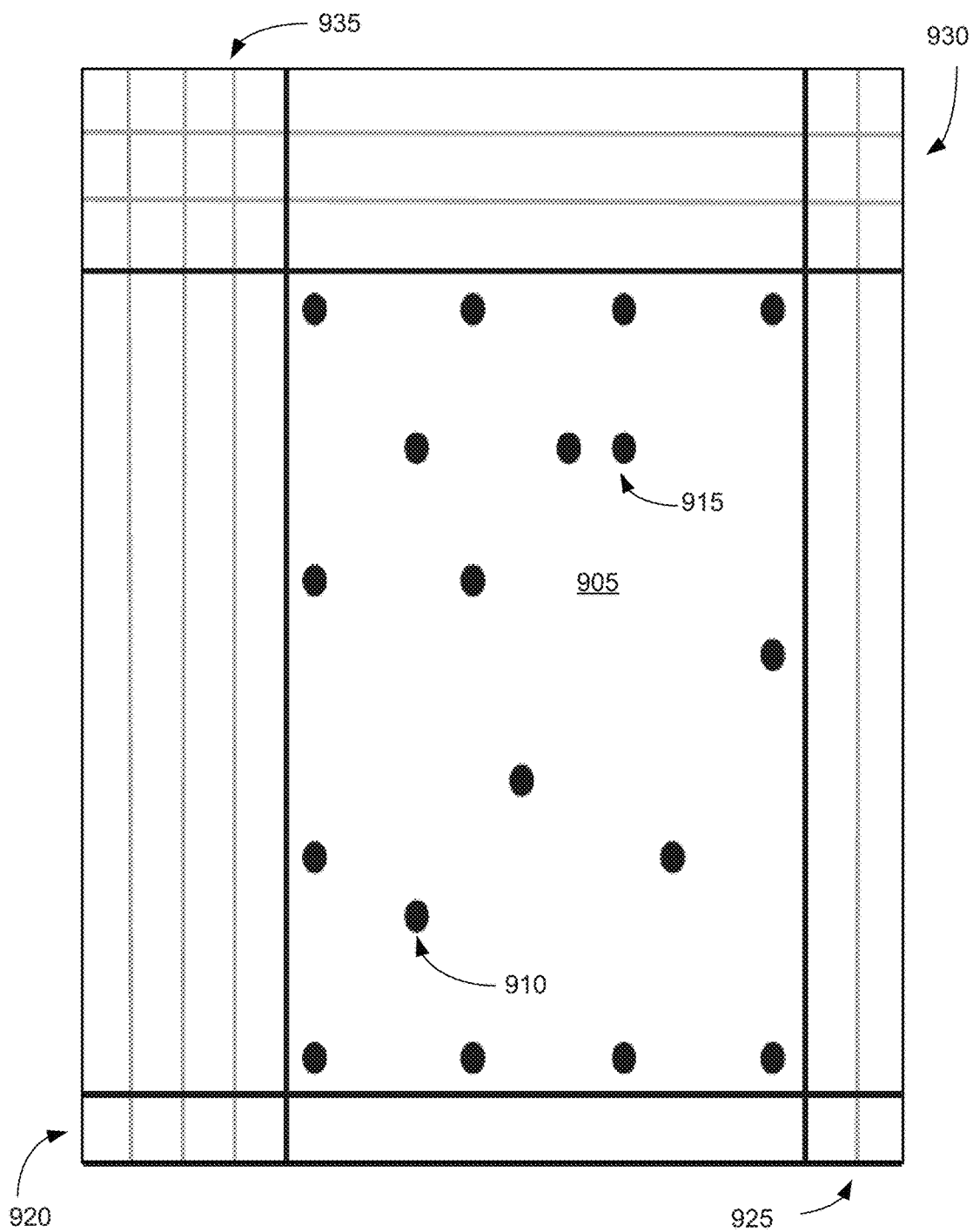
FIG. 9 is an illustrative depiction of a bounding rectangle, in accordance with some embodiments herein.

FIG. 9 is an illustrative depiction of a discretized bounding rectangle 900 containing a set of data 905, in accordance with some embodiments herein. The discretized bounding rectangle of FIG. 9 is encoded based on a 16×16 regular partitioning of the data. The example of FIG. 9 does not show a complete 16×16 grid. However, FIG. 9 does show the grid for the empty rows (columns) bordering the data set values (e.g., 910, 915). The empty rows/columns of FIG. 9 may be described by determining the empty border rows/columns beginning, for example, at the bottom row 920 and proceeding in a clockwise direction. The number of empty rows/columns for FIG. 9 is 1 empty bottom row (920), 2 empty right columns (925), 3 empty top rows (930), and 4 empty left columns (935). Accordingly, the bounding rectangle may be, in some embodiments, sufficiently described by an encoding of (1, 2, 3, 4). It is noted that each node may have a header and a total number of bits. The header, in some embodiments, may contain one bit to indicate the presence of a bounding rectangle, the compression scale used, and other aspects of the node. The total bits indicator may allow for a faster estimation as it alleviates a need to traverse the tree data structure down to the leafs in case the rectangle represented by the node is contained in the query rectangle. In some aspects, the rectangle the node represents need not be stored explicitly. Instead, it can be calculated during the estimation process and retained for further use(s). In particular, only the root node of some embodiments herein may contain the bounding rectangle of the whole data set.

In some aspects, efficiencies of the present disclosure may be improved by refining the leaf nodes of the tree data structure. In some embodiments, while the regular partitioning used in inner nodes is fixed, the partitioning can be refined or further (sub-)divided for leaf nodes. It is noted that leaf nodes do not contain any pointers. Further, it may be the case that a leaf node does not contain a bounding rectangle encoding. All these reclaimed bits (i.e., bits not used for pointer encoding, bounding rectangle encoding, etc.) may be used for encoding a grid. Thus, for example, a determination may be made to determine or calculate whether partitioning a node into a 6×6, 7×7, or even 8×8 grid can be used instead of a regular 5×5 partitioning. Based on this determination operation, the regular partitioning resulting in the smallest maximum tile frequency can be used.

In some embodiments, a construction of tree data structure (e.g., a GxTree) in accordance with some of the aspects herein can be constructed by systems, devices, services, applications, and combinations thereof. In some embodiments, the construction of the logical tree data structure may include (1) calculating a bounding rectangle of D, the set of all given data points. The construction process can further include (2) entering all non-empty tiles into a (priority) queue and (3) processing of the queue can continue until a space limit (or other constraint) is reached and/or until a desired estimation resolution is met. The resulting tree structure can (4) then be encoded.

It is noted that the first three steps may be viewed as comprising a first phase during which a tree with real points is constructed. Each node in the tree contains its type (e.g., based on the sizes G, M, L, or S introduced hereinabove), the regular partitioning it produced, and pointers to child nodes (if present). In step (4), the resulting tree can be encoded into four byte arrays with each array containing one of the four types of nodes. Additionally, the total number of data points and their bounding rectangle is stored in each node.

In large part, a bulk of the main work is accomplished in the processing of the priority queue. For example, the (priority) queue selects the tile containing the highest number of elements first and constructs a child node for them. Accordingly, each entry in the priority queue contains (i) a pointer to the node to which the tile belongs, (ii) the two indices identifying the tile, and (iii) the number of data points contained in the tile.

Processing of an entry in the priority queue may be accomplished by calculating regular 16×16 partitioning of the data points within the tile of the parent node. This determination or calculation can be used to determine whether a discretized bounding rectangle can be used. Then, based upon a number of data points in the tile, a determination can be made regarding the node type (e.g., size) and the node can be processed according to some regular partitioning. The resulting tiles may then be inserted into the queue. This process can continue until a given space limit is reached.

In some aspects, the first unprocessed entry in the queue after stopping the processing thereof yields the maximum frequency of an unsplit (i.e., undivided) tile. This result may be referred to as a MUSTF for maximum unsplit tile frequency, where the maximum frequency indicates an upper bound of the theta q-error.

In some aspects, an advantage of an estimation process herein is its straight-forward approach and efficiency. In some embodiments, the estimation process herein takes the query rectangle and the bounding rectangle of all data points as a parameter for the call on the root node's estimation procedure. Each node's estimation procedure, as a first matter, determines whether the query rectangle fully contains the rectangle it presents. If so, the total number of points explicitly stored is returned. Otherwise, the estimation proceeds by performing the following operations for each tile with a non-empty intersection with the query rectangle.

(1) If the tile is a split node (iBit=1), then the estimation procedure of the corresponding child node indicated by the iBit is called using the query rectangle and the tile rectangle.

(2) If the tile is an unsplit node (iBit=0), then the fraction of the tile rectangle intersected by the query rectangle multiplied with the tile frequency (i.e., decompressed from the fBits) is returned.

(3) All these partial tile estimates are then summed up and returned.

Figure 10:
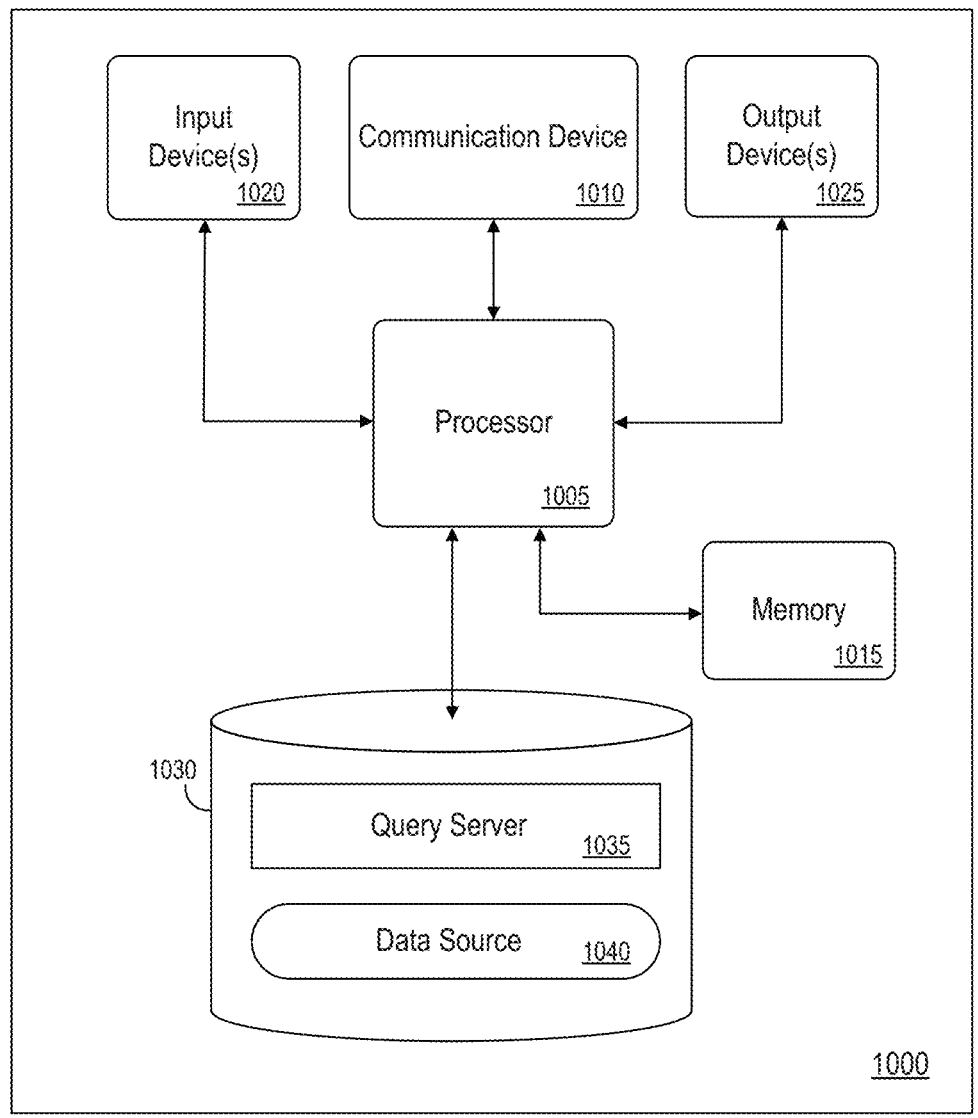
FIG. 10 is an illustrative depiction of a schematic block diagram of a system, in accordance with some embodiments herein.

FIG. 10 is a block diagram of apparatus 1000 according to some embodiments. Apparatus 1000 may comprise a general-purpose computing apparatus and may execute program code or instructions to perform any of the processes described herein. Apparatus 1000 may comprise an implementation of query server, comprising an in-memory database. Apparatus 1000 may include other unshown elements according to some embodiments.

Apparatus 1000 includes processor 1005 operatively coupled to communication device 1010, data storage device 1030, one or more input devices 1020, one or more output devices 1025 and memory 1015. Communication device 1010 may facilitate communication with external devices, such as a client device or a data storage device. Input device(s) 1020 may comprise, for example, a keyboard, a keypad, a mouse or other pointing device, a microphone, knob or a switch, an infra-red (IR) port, a docking station, and/or a touch screen. Input device(s) 1020 may be used, for example, to enter information into apparatus 1000. Output device(s) 1025 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1015 may comprise Random Access Memory (RAM).

Query server 1035 may comprise program code or instructions executed by processor 1005 to cause apparatus 1000 to perform any one or more of the processes described herein. Embodiments are not limited to execution of these processes by a single apparatus. Data source 1040 may implement data source 105 as described above. As also described above, data source 1040 may be implemented in volatile memory. Data storage device 1030 may also store data and other program code for providing additional functionality and/or which are necessary for operation of apparatus 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 and/or system 1000 may include a processor to execute program code such that the computing device operates as described herein.

All processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

The embodiments described herein are solely for the purpose of illustration. For example, some embodiments may include operation(s) to determine whether a determination of a cardinality estimate in accordance with the various embodiments disclosed herein should be modified and/or performed, at least in part. For example, if an estimate<theta/2, then the estimate may be assumed to be theta/2. This estimation will not overestimate the real value, although in some instances it may underestimate the real value. It has been observed that the maximum error (disregarding theta) is reduced drastically. In some aspects, in addition to the different bucket types, there are further special cases where histogram construction is not useful. Such cases may include, for example, columns with only unique values, when explicit frequencies per value consume less space than the histogram (e.g., when there are few distinct values in a column), etc. Those in the art will recognize other embodiments which may be practiced with modifications and alterations.

What is claimed is:

1. A computer-implemented method of optimizing execution of a query that accesses data by a computer, the method comprising:
   representing a given set of multidimensional data including a plurality of data points having a value by a hierarchical tree data structure including nodes, each node representing a distribution of a subset of the points in the data set and being partitioned into tiles;
   calculating a bounding rectangle of the data points in each node;
   entering all non-empty tiles into a queue;
   processing of the queue can continue until a computational memory space limit is reached or until a desired estimation resolution is met;
   encoding the resulting tree structure;
   determining compression scales for the hierarchical tree data structure, the compression scale including a compression factor and a decompression factor;
   persisting a record of the compression scales; and
   during the processing of the queue, compressing and decompressing the nodes using the compression scales.

2. The method of claim 1, further comprising determining a classification for each of the nodes, the determined classification being selected from a plurality of possible classifications.

3. The method of claim 2, wherein the classification is based on a size of the tiles comprising each node.

4. The method of claim 2, further comprising configuring the queue based on the classification of the tiles.

5. The method of claim 4, wherein tiles are processed based on an order thereof in the queue.

6. The method of claim 3, further comprising:
storing nodes of a same classification in a same array;
indexing a child node by a child base index containing an index of a first child node within the array, wherein the children of each node are stored consecutively; and
indexing the children nodes other than the first child node within a sub-array of the array of the children nodes.

7. The method of claim 1, wherein the compression scales vary depending on a number of bits used to represent the range of values of the node.

8. The method of claim 1, further comprising:
determining whether a query rectangle is fully contained within a bounding rectangle for all the data points;
in response to the determination that the query rectangle is fully contained within the bounding rectangle, store the number of data points as an estimate for the query; and
in response to the determination that the query rectangle is not fully contained within the bounding rectangle, a total frequency of all tiles that are fully contained by the query tile can be summed and a fraction of the frequency of a tile according to the area covered by the query tile is added.

9. A non-transitory, computer-readable medium storing program instructions thereon, the medium comprising:
instructions to represent a given set of multidimensional data including a plurality of data points having a value by a hierarchical tree data structure including nodes, each node representing a distribution of a subset of the points in the data set and being partitioned into tiles;
instructions to calculate a bounding rectangle of the data points in each node;
instructions to enter all non-empty tiles into a queue;
instructions to process of the queue can continue until a computational memory space limit is reached or until a desired estimation resolution is met; and
instructions to encode the resulting tree structure;
instructions to determine compression scales for the hierarchical tree data structure, the compression scale including a compression factor and a decompression factor;
instructions to persist a record of the compression scales; and
instructions to, during the processing of the queue, compress and decompress the nodes using the compression scales.

10. The medium of claim 9, further comprising instructions to determine a classification for each of the nodes, the determined classification being selected from a plurality of possible classifications.

11. The medium of claim 10, wherein the classification is based on a size of the tiles comprising each node.

12. The medium of claim 10, further comprising instructions to configure the queue based on the classification of the tiles.

13. The medium of claim 12, wherein tiles are processed based on an order thereof in the queue.

14. The medium of claim 11, further comprising:
instructions to store nodes of a same classification in a same array;
instructions to index a child node by a child base index containing an index of a first child node within the array, wherein the children of each node are stored consecutively; and
instructions to index the children nodes other than the first child node within a sub-array of the array of the children nodes.

15. The medium of claim 9, wherein the compression scales vary depending on a number of bits used to represent the range of values of the node.

16. The medium of claim 9, further comprising:
instructions to determine whether a query rectangle is fully contained within a bounding rectangle for all the data points;
instructions to, in response to the determination that the query rectangle is fully contained within the bounding rectangle, store the number of data points as an estimate for the query; and
instructions to, in response to the determination that the query rectangle is not fully contained within the bounding rectangle, a total frequency of all tiles that are fully contained by the query tile can be summed and a fraction of the frequency of a tile according to the area covered by the query tile is added.

17. A system, comprising:
a memory storing processor-executable program instructions, and
a processor to execute the processor-executable program instructions in order to:
represent a given set of multidimensional data including a plurality of data points having a value by a hierarchical tree data structure including nodes, each node representing a distribution of a subset of the points in the data set and being partitioned into tiles;
calculate a bounding rectangle of the data points in each node;
enter all non-empty tiles into a queue;
process of the queue can continue until a computational memory space limit is reached or until a desired estimation resolution is met;
encode the resulting tree structure;
determine compression scales for the hierarchical tree data structure, the compression scale including a compression factor and a decompression factor;
persist a record of the compression scales; and
during the processing of the queue, compress and decompress the nodes using the compression scales.

18. The system of claim 17, including execution of the processor-executable program instructions causing the processor to:
determine a classification for each of the nodes, the determined classification being selected from a plurality of possible classifications, the classification is based on a size of the tiles comprising each node;
store nodes of a same classification in a same array;
index a child node by a child base index containing an index of a first child node within the array, the children of each node are stored consecutively; and
index the children nodes other than the first child node within a sub-array of the array of the children nodes.

19. The system of claim 17, including execution of the processor-executable program instructions causing the processor to vary the compression scales depending on a number of bits used to represent the range of values of the node.

20. The system of claim 17, including execution of the processor-executable program instructions causing the processor to:
determine whether a query rectangle is fully contained within a bounding rectangle for all the data points;
in response to the determination that the query rectangle is fully contained within the bounding rectangle, store the number of data points as an estimate for the query; and in response to the determination that the query rectangle is not fully contained within the bounding rectangle, sum a total frequency of all tiles that are fully contained by the query tile, and add a fraction of the frequency of a tile according to the area covered by the query tile.

* * * * *